US012610354B2

(12) United States Patent
Kim

(10) Patent No.: US 12,610,354 B2
(45) Date of Patent: Apr. 21, 2026

(54) INTELLIGENT BAND SWITCHING

(71) Applicant: Boost SubscriberCo LLC, Englewood, CO (US)

(72) Inventor: In-Kyung Kim, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 390 days.

(21) Appl. No.: 18/173,292

(22) Filed: Feb. 23, 2023

(65) Prior Publication Data

US 2024/0292389 A1 Aug. 29, 2024

(51) Int. Cl.
| | |
|---|---|
| *H04W 72/0453* | (2023.01) |
| *H04B 17/318* | (2015.01) |
| *H04L 5/00* | (2006.01) |
| *H04W 36/30* | (2009.01) |

(52) U.S. Cl.
CPC ...... *H04W 72/0453* (2013.01); *H04B 17/318* (2015.01); *H04L 5/001* (2013.01); *H04W 36/302* (2023.05)

(58) Field of Classification Search
CPC ..... H04B 17/318; H04L 5/001; H04L 5/0098; H04W 36/302; H04W 72/0453
See application file for complete search history.

(56) References Cited

U.S. PATENT DOCUMENTS

2012/0113859 A1 5/2012 Jung et al.
2015/0200690 A1 7/2015 Youssef et al.

2019/0230663 A1* 7/2019 Lim .................. H04W 72/0453
2021/0360684 A1 11/2021 Alasti et al.
2022/0312405 A1* 9/2022 Sun ......................... H04L 5/001
(Continued)

FOREIGN PATENT DOCUMENTS

WO 2022/149942 A1 7/2022

OTHER PUBLICATIONS

3rd Generation Partnership Project; Technical Specification Group RAN WG4; Permanent Reference Document (PRD); Rules, guidelines and ways of working for introduction of band combinations in NR and LTE; Feb. 2025 (Year: 2025).*

(Continued)

*Primary Examiner* — Benjamin H Elliott, IV
(74) *Attorney, Agent, or Firm* — Kilpatrick Townsend & Stockton LLP

(57) ABSTRACT

Intelligent band switching is disclosed. "LO" bands are those with frequencies of less than one gigahertz (GHz) and "HI" bands are those with frequencies of approximately 1.7 GHz or more. Two or more LO bands may be aggregated ("LOLO") when the signal strength received by user equipment (UE) is above a minimum signal strength threshold, for example. A LO band and a HI band may be aggregated ("LOHI") when the signal strength received by the UE is below the minimum signal strength threshold. The UE may prefer to use LOLO based on a policy, and switching from LOLO to LOHI, and vice versa, is based on the comparison of the received signal strength to the minimum signal strength threshold. Three, four, or more LO bands may be aggregated if the resultant drop in signal strength is still above the minimum signal strength threshold, for instance.

19 Claims, 6 Drawing Sheets

(56) References Cited

U.S. PATENT DOCUMENTS

| | | | |
|---|---|---|---|
| 2023/0199912 A1* | 6/2023 | Lu | H04W 76/36 |
| | | | 370/329 |
| 2023/0209629 A1* | 6/2023 | Lim | H04B 1/525 |
| | | | 370/329 |
| 2024/0292389 A1* | 8/2024 | Kim | H04W 72/0453 |
| 2025/0081173 A1* | 3/2025 | Umeda | H04W 8/24 |
| 2025/0193864 A1* | 6/2025 | Kim | H04W 72/54 |

OTHER PUBLICATIONS

"Simultaneous Rx/Tx capability for FR1+FR1 FDD-TDD band combination Agenda Item:"; ZTE; 3GPP TSG-RAN WG4 Meeting #101-e R4-2119215 Electronic Meeting, Nov. 1-12, 2021 (Year: 2021).*
"On simultaneous Rx-Tx for NR inter-band combinations"; Apple; 3GPP RAN WG4 Meeting #105 R4-2218106 Toulouse, France, Nov. 14-18, 2022 (Year: 2022).*
"Discussion on low-low band CA via switching"; ZTE et al.; 3GPP TSG-RAN4 Meeting # 114 R4-2500940 Athens, Grace, Feb. 17-21, 2025 (Year: 2025).*
LG Electronics, "Discussion on feasibility for inter-band DL CA," 3GPP TSG-RAN WG4 Meeting #98-bis-e, Electronic Meeting; Apr. 12, 2021-Apr. 20, 2021 Apr. 12-20, 2021, XP052176138, 4 pages.
International Search Report and Written Opinion for PCT/US2024/011678 mailed May 6, 2024, 12 pages.

* cited by examiner

100

110

130

120

UE                RAN        Carrier Network Infrastructure

300

310

400

500

INTELLIGENT BAND SWITCHING

FIELD

The present invention generally relates to telecommunications, and more specifically, to intelligent band switching.

BACKGROUND

Telecommunications networks for existing carriers support various bands, and modern smart phones can use and aggregate multiple bands simultaneously. The smart phone tunes multiple bands (e.g., two or three bands), filters them, and performs base end signal processing. As used herein, "LO" bands or "low bands" are those with frequencies of less than one gigahertz (GHz) and "HI" bands or "high bands" are those with frequencies of approximately 1.7 GHz or more. Table 1 below lists the supported fifth generation (5G) bands for AT&T®, Verizon®, T-Mobile®, and Sprint®

TABLE 1

5G BANDS SUPPORTED BY CARRIERS

| Carrier: | Supported 5G Bands: |
| --- | --- |
| DISH ® | n26, n29, n48, n66, n70, n71, n77 |
| AT&T ® | n5, n77, n260 |
| Verizon ® | n2, n5, n66, n77, n260, n261 |
| T-Mobile ® | n41, n71, n260, n261 |

However, current smart phone form factors do not adequately facilitate the use of multiple low bands simultaneously. Accordingly, an improved and/or alternative approach may be beneficial.

SUMMARY

Certain embodiments of the present invention may provide solutions to the problems and needs in the art that have not yet been fully identified, appreciated, or solved by current telecommunications technologies, and/or provide a useful alternative thereto. For example, some embodiments of the present invention pertain to intelligent band switching.

In an embodiment, a non-transitory computer-readable medium stores a computer program for performing intelligent band switching. The computer program is configured to cause at least one processor to measure a signal received by UE operating in a LO mode, a LOLO mode, or a LOHI mode where the UE uses at least one current LO band. The computer program is also configured to cause the at least one processor to determine that the received signal is adequate for aggregation of at least one additional LO band by comparing the measured signal to a minimum threshold. The computer program is further configured to cause the at least one processor to aggregate the at least one additional LO band with the at least one current LO band.

In another embodiment, a computer-implemented method for performing intelligent band switching includes measuring a signal received by UE operating in a LOLO mode with two or more current aggregated LO bands, by the UE. The computer-implemented method also includes determining that the received signal is inadequate for aggregation of the two or more current aggregated LO bands by comparing the measured signal to a minimum threshold, by the UE. The computer-implemented method further includes releasing at least one LO band of the two or more current aggregated LO bands, by the UE.

In yet another embodiment, a computing system includes memory storing computer program instructions for performing intelligent band switching and at least one processor configured to execute the computer program instructions. While the computing system is operating in a LO mode or a LOHI mode including a current LO band, the computer program instructions are configured to cause the at least one processor to measure a signal received by the computing system, determine that the received signal is adequate for aggregation of at least one additional LO band by comparing the measured signal to a minimum threshold, and aggregate the at least one additional LO band with a current LO band. While the computing system is operating in a LOLO mode including two or more current aggregated LO bands, the computer program instructions are configured to cause the at least one processor to measure the signal received by the computing system, determine that the received signal is inadequate for aggregation of the two or more current aggregated LO bands by comparing the measured signal to the minimum threshold, and release at least one LO band of the two or more current aggregated LO bands.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
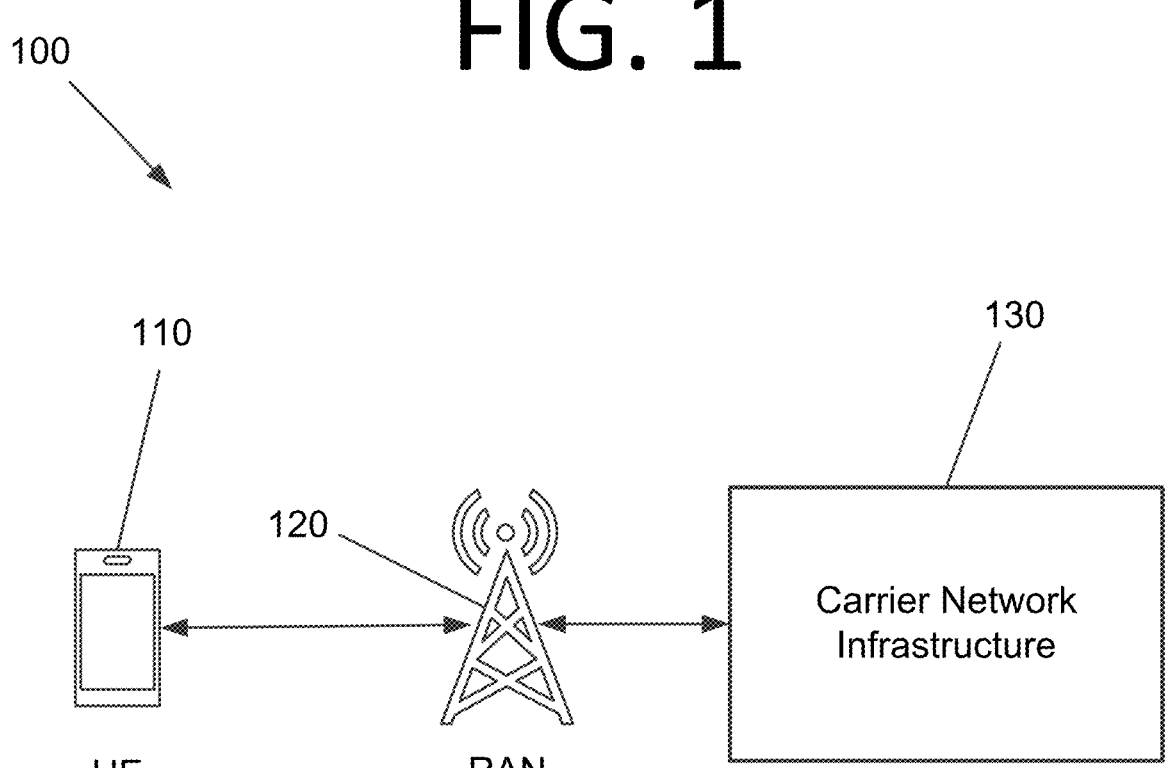
FIG. 1 is an architectural diagram illustrating a carrier network and UE configured to implement intelligent band switching, according to an embodiment of the present invention.

Some embodiments pertain to intelligent band switching. Multiple bands can be aggregated simultaneously, which is referred to as "carrier aggregation (CA)." CA provides more bandwidth and higher data rates. In order to aggregate two or more LO bands simultaneously (referred to herein as "LOLO") and maintain adequate link performance, the antenna volume would need to be doubled and the isolation must be increased (in other words, the antennas in the device need to be further apart). The effective antenna volume is the actual volume occupied by the radiating part of the antenna plus one-half wavelength all the way around. It is also possible to aggregate the LO bands without changing the user equipment (UE) form factor by sacrificing signal strength. When the signal strength of the UE (e.g., a smart phone, a laptop computer or other computer with cellular communication hardware, etc.) is sufficiently high to maintain the link, LOLO may be used. In some embodiments, at least one HI band is used as well within the context of LOLO, but in LOHI mode, a single LO band is used. In certain embodiments, one or more of the HI bands that the UE was previously using in LOHI mode are released when switching to LOLO mode.

However, when the signal strength falls below a threshold minimum signal strength for using LOLO, the smart phone or other computing system switches to using a LO band and a HI band (referred to herein as "LOHI"). Such embodiments allow use of more of the spectrum without practical limitations. In certain embodiments where no HI band(s) are available, the UE device may use a single LO band instead.

Carriers have multiple LO bands, and LOLO CA is beneficial. However, no current smartphone supports LOLO due to the form factor limitations discussed above. Hence, n71+n29, n26+n66+n70, etc. are not supported. This is a significant limitation for the offered throughput and flexible use of frequencies that is alleviated by some embodiments.

The signal strength is that is sufficiently high for using LOLO depends on the deployment. The radio access network (RAN) (e.g., a base station or gNodeB (gNB)) configures various thresholds for handover. The UE monitors the signal qualities for the frequency being used and the other frequencies, as well as the frequencies of neighboring cells. Based on the measurement and the thresholds, the UE is able to determine whether the coverage area is adequate for LOLO. Also, the UE can determine that if it loses 3 dB of signal power, for example, the UE would not lose the link or be forced to handover. In other words, a sufficiently high signal strength may be defined as one that enables the UE to maintain the link and not be forced to handover. The UE can apply LOLO CA until the UE sees that it is being forced to handover or lose the link. The UE can then give up LOLO to gain a link margin (e.g., 3 dB).

When in LOLO mode, the UE knows when it nears the cell boundary through the measurements and the threshold values. Typically, in this situation, the base station or gNB will instruct UE for the measurement process, which is part of preparation for handover. However, in some embodiments, the UE knows that handover is premature since if the UE releases LOLO, the UE will gain a certain link margin (e.g., 1.8 dB, 3 dB, etc.), for example, and stay on at least one of the LO frequencies. In other words, the UE releases one LO frequency from LOLO CA and stays on a single LO frequency or the original number of LOLO CA frequencies minus one.

At this point, the base station or gNB should know that the release of one of the LOLO frequencies, and the attendant dB increase, is not because of coverage loss of the released LO frequency. In other words, for UE not supporting LOLO (or a single LO frequency), the UE is still in the coverage area and sees a higher signal strength (link margin). Otherwise, the UE could confuse the base station or gNB of the LO band's proper coverage area. The UE can update its capability by removing LOLO for this purpose or indicate to the base station or gNB that the UE cannot accommodate the LOLO CA operation.

The opposite scenario is similar. When in single LO band operation or LOLO operation where aggregation of an additional LO band may be possible, by its signal measurements, the UE will know even if of the attendant amount of power is lost, the UE can still maintain the link. The UE can then add the additional LO band for LOLO CA. The base station or gNB will start exercising LOLO with the UE accordingly.

5G operating frequency bands n26, n29, and n71 are LO bands, for example. Band n26, often referred to as "extended cellular (CLR)," is a full division duplexing (FDD) band (duplex spacing of 45 megahertz (MHz)) with a frequency of approximately 850 MHz (uplink 814-849 MHz and downlink 859-894 MHz) with channel bandwidths of 5, 10, 15, 20, 25, and 30 MHz. Band n29, often referred to as "lower SMH," where SMH stands for seven hundred megahertz, is an FDD supplemental downlink (SDL) band with a frequency of approximately 700 MHz (downlink 717-728 MHz) with channel bandwidths of 5, and 10 MHz. Band n71, often referred to as "digital dividend," is an FDD band (duplex spacing of −46 MHz) with a frequency of approximately 600 MHz (uplink 663-698 MHz and downlink 617-652 MHz) with channel bandwidths of 5, 10, 15, 20, 25, 30, and 35 MHz.

5G operating frequency bands n48, n66, n70, and n77 are HI bands, for example. Band n48, often referred to as "citizens broadband radio service (CBRS)," is an FDD band with a frequency of approximately 3.500 GHz (uplink and downlink 3.550-3.700 GHz) with channel bandwidths of 5, 10, 15, 20, 30, 40, 50, 60, 70, 80, 90, and 100 MHz. Band n66, often referred to as "extended advanced wireless service (AWS)," is an FDD band with a frequency of approximately 1.700 and 2.100 GHz (uplink 1.710-1.780 GHz and downlink 2.110-2.200 GHz) with duplex spacing of approximately 400 MHz and channel bandwidths of 5, 10, 15, 20, 25, 30, 35, 40, and 45 MHz Band n70, often referred to as "supplementary AWS," is an FDD band with a frequency of approximately 1.700 and 2.000 GHz (uplink 1.695-1.710 GHz and downlink 1.995-2.020 GHz) with duplex spacing of approximately 300 MHz and channel bandwidths of 5, 10, 15, 20, and 25 MHz. Band n77, often referred to as "C-band," is a time division duplexing (TDD) band with a frequency of approximately 3.700 GHz (uplink and downlink 3.300-4.200 GHz) with channel bandwidths of 10, 15, 20, 25, 30, 40, 50, 60, 70, 80, 90, and 100 MHz.

The UE may be configured to use LOLO as a default when there is sufficient signal strength to do so. In order to determine whether to use LOLO or LOHI, the UE measures the signal strength received at the device. When the device is using LOLO and the signal strength falls below a minimum signal strength threshold, or when the device is using LO or LOHI and the signal strength rises above the minimum signal strength threshold, the UE sends a communication to the carrier network indicating that aggregation of at least one additional LO band should occur, and potentially provides its capabilities (e.g., the UE model, the bands supported by the UE, the bands that the UE is currently using, the detected signal strength, etc.). The carrier network then reconfigures the UE to operate in LOLO or LO/LOHI, and the UE implements the change on its end via its low band antenna switches. Because the carrier network knows that the UE can operate in LOLO mode, the carrier network can enable LOLO CA. This may be performed by the RAN, for example, in order to reduce the load on carrier network equipment. However, in certain embodiments, the carrier network may assist in this switching decision (e.g., making a decision regarding which band(s) to aggregate and/or which band(s) to release).

In some embodiments, more than two low bands may be used. For instance, if in a strong signal area and a certain reduction in signal strength can occur and still remain above the threshold (e.g., 4.8 dB), three LO bands could be utilized simultaneously. Even more bands may be used without deviating from the scope of the invention if the attendant drop in signal strength can be tolerated. Assuming that the antenna volume is fixed and that the antenna gain for a single frequency is zero, the theoretical value for transmitting in multiple frequencies is $10*\log(n)$, where n is the number of frequencies. This value can be used to provide the loss that will occur, which can be compared against the current signal strength to determine whether the UE can tolerate the loss. It should be noted that additional implementation loss should be added in practice, typically in fractional dB.

Consider the example where a carrier network uses LOLO and LOHI. In this case, two thresholds may be used to determine whether two band LOLO CA or three band LOLO CA is feasible. If a first signal strength drop can be tolerated while maintaining the link and minimum quality (e.g., a 4.8 dB signal strength drop), three band LOLO CA may be used. If this is not the case, but a certain lower signal strength drop can still be tolerated (e.g., a 3 dB signal strength drop), two band LOLO CA may be used. If neither can be tolerated, LO or LOHI may be used. Any number of LO bands for CA may be used in this manner with associated signal drop thresholds without deviating from the scope of the invention. Also, in some cases, HI bands may not be available in a certain area or may be congested. In such cases, LO bands may be used exclusively (e.g., LO, two band LOLO CA, three band LOLO CA, etc.)

FIG. 1 is an architectural diagram illustrating a carrier network 120, 130 and UE 110 configured to implement intelligent band switching, according to an embodiment of the present invention. UE 110 communicates with carrier network infrastructure 130 via a radio access network (RAN) 120. While a single RAN is shown here, multiple RANs may be used, as discussed later herein. Carrier network infrastructure 130 may include computing systems and other equipment associated with breakout edge data centers (BEDCs), regional data centers (RDCs), national data centers (NDCs), etc.

Carrier network infrastructure 130 may provide various network functions (NFs) and other services. For instance, BEDCs may break out User Plane Function (UPF) data traffic (UPF-d) and provide cloud computing resources and cached content to UE 110, such as providing NF application services for gaming, enterprise applications, etc. RDCs may provide core network functions, such as UPF for voice traffic (UPF-v) and Short Message Service Function (SMSF) functionality. NDCs may provide a Unified Data Repository (UDR) and user verification services, for example. Other network services that may be provided may include, but are not limited to, Internet Protocol (IP) multimedia subsystem (IMS) IMS+telephone answering service (TAS) functionality, IP-SM gateway (IP-SM-GW) functionality (the network functionality that provides the messaging service in the IMS network), enhanced serving mobile location center (E-SMLC) functionality, policy and charging rules function (PCRF) functionality, mobility management entity (MME) functionality, signaling gateway (SGW) control plane (SGW-C) and user data plane (SGW-U) ingress and egress point functionality, packet data network gateway (PGW) control plane (PGW-C) and user data plane (PGW-U)

ingress and egress point functionality, home subscriber server (HSS) functionality, UPF+PGW-U functionality, access and mobility management (AMF) functionality, HSS+unified data management (UDM) functionality, session management function (SMF)+PGW-C functionality, short message service center (SMSC) functionality, and/or policy control function (PCF) functionality. It should be noted that additional and/or different network functionality may be provided without deviating from the present invention. The various functions in this carrier system may be performed using dockerized clusters in some embodiments.

RAN 120 transmits signals in bands supported by the carrier. See Table 1 above, for example. UE 110 communicates with RAN 120 using one or more bands that have been assigned by carrier infrastructure 130 (e.g., LO, LOLO, LOHI, etc.). The configuration is performed by carrier infrastructure 130 and the actual assignment of the band(s) is performed in real time or near-real time by RAN 120. UE 110 also measures the received signal strength from RAN 120 in the assigned band(s), and potentially other band(s) that are not currently being used. For example, the UE may use signal strength, signal-to-noise ratio (SNR), and/or signal to interference and noise ratio (SINR). The received signal measurements may be a standard procedure for the UE based on the accuracy requirements stated in 3rd Generation Partnership Project (3GPP) standards.

If UE 110 is using LO or LOHI, but the received signal strength from RAN 120 rises above a minimum acceptable signal strength threshold, UE 110 requests a switch to LOLO or to aggregate additional LO band(s) from RAN 120. In some embodiments, the request includes the hardware capabilities of UE 110 and/or the bands that UE 110 can use with its hardware. RAN 120 determines whether additional LO band(s) are reasonably available for use by UE 110. This determination may be made on the basis of congestion, interference, bands supported by UE 110, and the like. Ideally, all available frequencies would be aggregated for optimal use of the spectrum assets, providing a better service. However, the number of bands that can be aggregated via CA depends on the signal strength, the UE form factor, network congestion at the RAN on the bands, etc.

If additional LO band(s) are available under these criteria, RAN 120 assigns these band(s) to UE 110 and sends instructions to UE 110 to aggregate these band(s) for LOLO. UE 110 then switches its bands using band switching hardware and UE 110 communicates via the aggregated LOLO bands. Per the above, in some embodiments, three, four, or more LO bands may be assigned to and aggregated by UE 110 if the drop in signal strength is tolerable.

Various advantages may be provided by some embodiments. For instance, more of the available spectrum may be used when the signal strength permits. Also, higher data rates may be achieved. Furthermore, LOLO/LOHI switching is a more advantageous mechanism for performing load balancing than frequency handover. If LOLO not permitted, frequency handover has to be exercised for load balancing.

Figure 2:
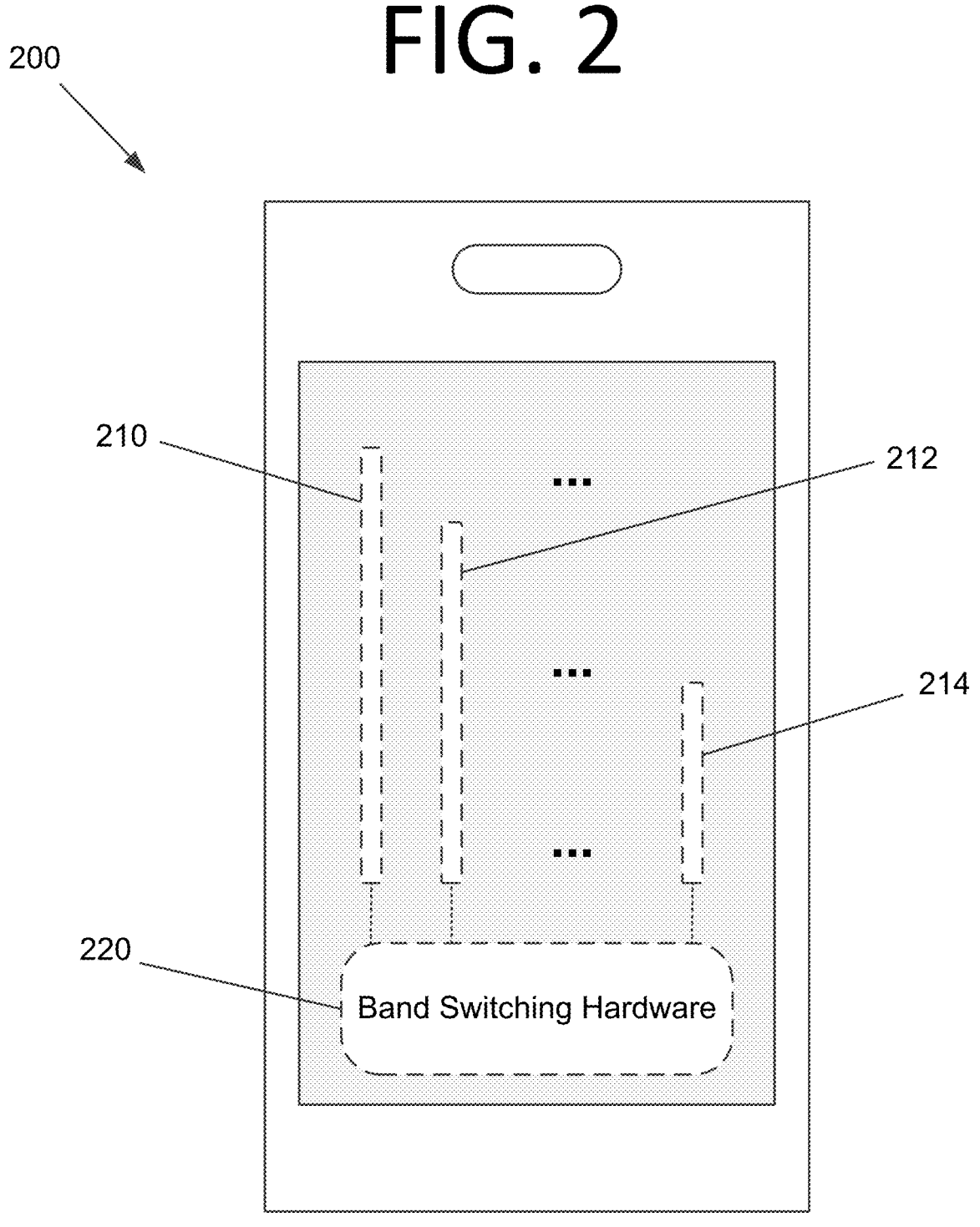
FIG. 2 illustrates a smart phone with multiple antennas, according to an embodiment of the invention.

FIG. 2 illustrates a smart phone 200 with multiple antennas 210, 212, 214, according to an embodiment of the invention. Smart phone 200 is capable of using multiple bands via its multiple antennas 210, 212, 214. Modern smart phones frequently include four to thirteen different antennas. At least two are often used for the lower and upper cellular frequencies, and the antennas are usually spaced as far apart from one another as the form factor allows.

The optimum size for antennas is half of the respective wavelength. However, the wavelengths of radio signals at frequencies used by smart phones can be relatively large.

For instance, the wavelength of a radio signal with a frequency of 1 GHz is approximately one foot and the wavelength at 2 GHz is approximately half a foot given that the wavelength is inversely proportional to the frequency. Thus, reducing the antenna size from the optimal size is usually desirable to provide a more compact form factor.

An antenna with a physical length of ¼ of the wavelength typically still works well. Other techniques for reducing the antenna size may also be used, such as using the ground plane of the circuit board, using the UE cover, and/or zig-zagging the antenna trace on the board. While antennas smaller than an effective physical length of one-quarter wavelength may still work, the signal strength drops roughly with the area of the antenna and the available frequency bandwidth shrinks.

In FIG. 2, antennas 210, 212, 214 are not necessarily to scale or the shape that would be implemented in a modern smart phone, but each is designed to perform well for a given supported wavelength. In this embodiment, antennas 210, 212 are designed for respective LO bands and antenna 214 is designed for a respective HI band. Other antennas for other bands may be included without deviating from the scope of the invention. When operating in LOLO, antennas 210, 212 are used, potentially in conjunction with antenna 214. When operating in LOHI, antennas 210, 214 or 212, 214 are used. Band switching hardware 220 controls switching between using antennas 210, 212, 214, etc.

Antennas 210, 212, 214 are designed for particular frequencies, per the above. Band switching hardware 220 in this embodiment includes tunable switches or variable tuning capability for creating multiple resonances. For instance, an LC (inductance/capacitance) matching component may be used as part of band switching hardware 220 for the antennas. Multiple matching components are used to support multiple frequency transmission. The switching connects the desired antenna to the desired matching component. Antennas 210, 212, 214 should be connected to multiple matching components to prevent the matching components from creating multiple resonances. The switching may be mechanical, following the instructions from the UE processor(s). Software executed by the processor(s) may maximize the utilization of aggregated LO bands.

Figure 3A:
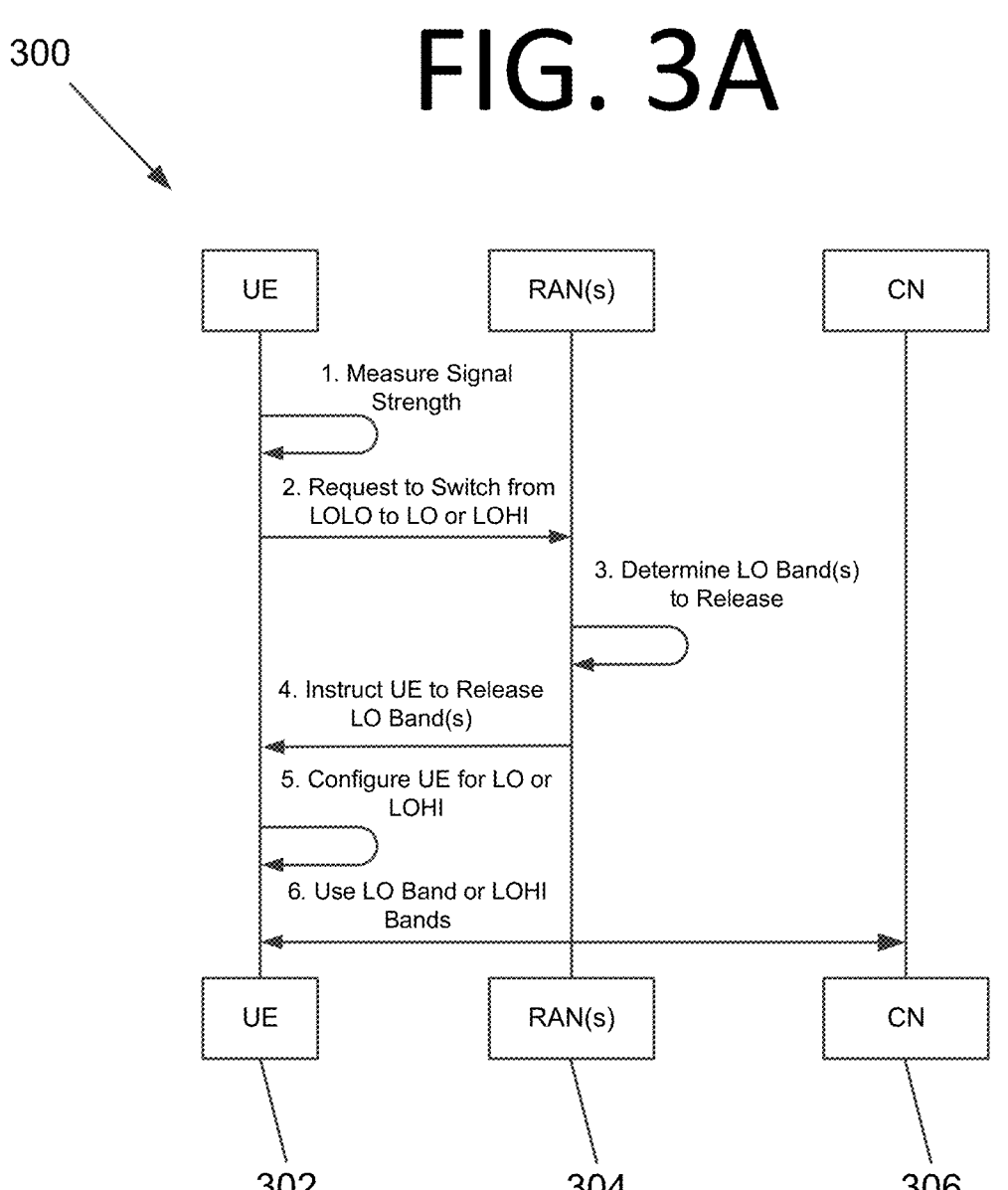
FIG. 3A is a flow diagram illustrating a process for releasing at least one LO band, according to an embodiment of the present invention.

FIG. 3A is a flow diagram illustrating a process 300 for releasing at least one LO band, according to an embodiment of the present invention. UE 302, which is operating in LOLO in this embodiment, measures its received signal strength from RAN(s) 304. In other words, more than one RAN may be in range, and one or more bands may be used for communication therewith, potentially with a different set of bands per RAN. The received signal strength then drops below a minimum signal strength threshold. UE 302 then requests a switch from LOLO to LO or LOHI from carrier network 306, depending on whether HI band(s) are available in the area. In some embodiments, UE 302 may request the switch to LO or LOHI at the first instance of detecting the drop below the minimum signal strength, SNR, and/or SINR threshold, after multiple detected instances thereof during a detection period (e.g., one second, ten seconds, one minute, etc.), after a predetermined amount of time below the threshold, etc.

RAN(s) 304 determine LO band(s) for UE 302 to release and instructs UE 302 to release these LO band(s). UE 302 then configures itself to use the LO band or LOHI bands (e.g., by stopping use of one or more of the LO band(s)/ antenna(s)) and uses the LO band or LOHI bands for communications. In some embodiments, multiple HI bands may be used in LOHI without deviating from the scope of the invention. In certain embodiments, one or more HI bands may not be available since HI band coverage is smaller than that of LO band coverage. In such a scenario, if the link cannot be maintained for LOLO, UE 302 and RAN(s) 304 may switch to using a single LO band.

Figure 3B:
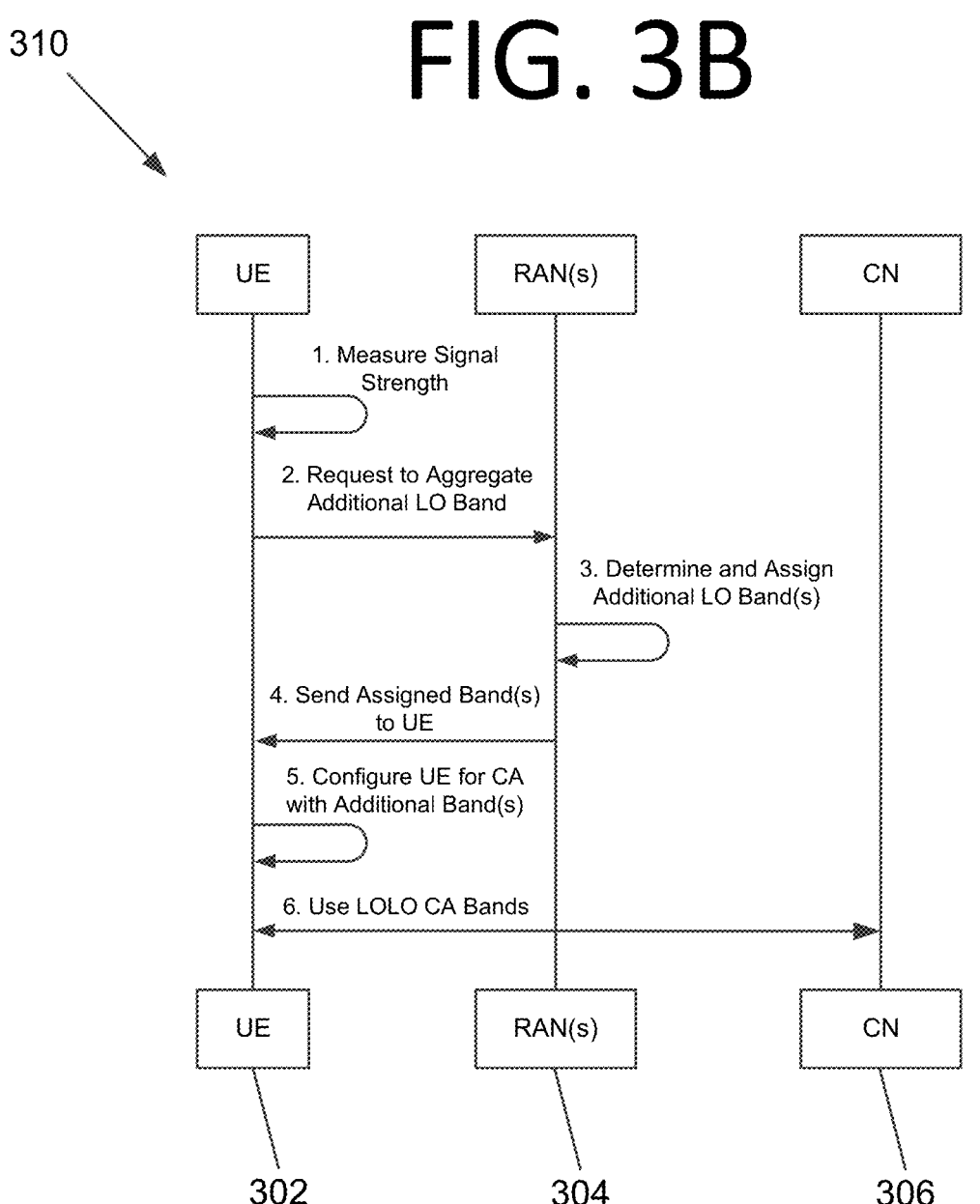
FIG. 3B is a flow diagram illustrating another process for aggregating at least one additional LO band, according to an embodiment of the present invention.

FIG. 3B is a flow diagram illustrating a process 310 for aggregating at least one additional LO band, according to an embodiment of the present invention. UE 302, which is operating in LO, LOLO, or LOHI in this embodiment, measures its received signal strength from RAN 304. The received signal strength then rises above a minimum signal strength threshold for aggregation of one or more additional LO band. UE 302 then sends a request to RAN(s) 304 to aggregate additional LO band(s). In some embodiments, UE 302 may request the additional LO band(s) at the first instance of detecting the signal strength, SNR, and/or SINR being above a minimum threshold, after multiple detected instances thereof during a detection period (e.g., one second, ten seconds, one minute, etc.), after a predetermined amount of time above the minimum threshold, etc.

RAN(s) 304 determine one or more additional LO bands for UE 302 to aggregate, assigns UE 302 to these LO band(s), and sends the assigned LO band(s) for aggregation to UE 302. UE 302 then configures itself to aggregate these bands (e.g., by using respective additional band antenna(s)) and uses the LOLO bands for communications. In some embodiments, the HI band(s) may be released. If the signal strength drop can be tolerated and UE 302 supports them, any suitable number of LO bands may be aggregated without deviating from the scope of the invention.

Figure 4:
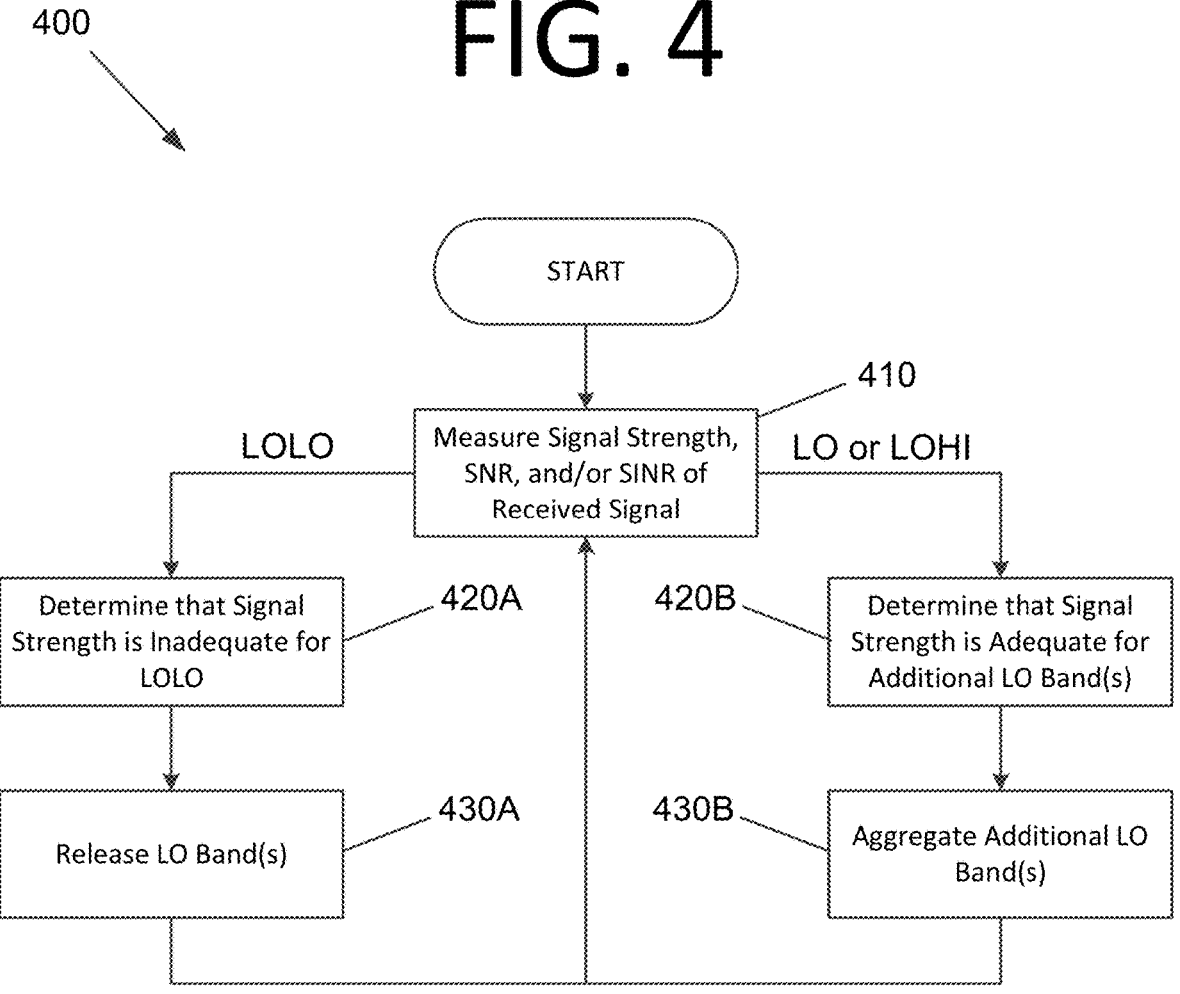
FIG. 4 is a flowchart illustrating a process for performing intelligent band switching, according to an embodiment of the present invention.

FIG. 4 is a flowchart illustrating a process for performing intelligent band switching, according to an embodiment of the present invention. The process begins with measuring a signal strength, SNR, and/or SINR of a signal received by UE at 410. When the UE is operating in LOLO mode, the UE determines that the received signal strength is inadequate for aggregation of the current LOLO CA bands by comparing the measured signal strength, SNR, and/or SINR to a minimum threshold at 420A. The UE then releases one or more LO bands of the current LOLO CA bands at 430A.

Measuring the SNR or SINR may be useful in certain scenarios as a primary parameter for LO band switching. For instance, in a sector-to-sector handover scenario where the UE is near the boundary between the sectors, the signal strength can be very high, but the SINR can be very low (e.g., below 0 dB). In such a case, the SINR may be used as the primary parameter for switching. In a site-to-site handover scenario, the UE may be in a noise-limited situation. In this case, the SNR may be the best parameter for determining whether to switch.

In some embodiments, the determination that the received signal strength is adequate for operation in the LOLO mode and/or aggregation of at least one additional LO band includes determining that the measured signal strength rose above the signal strength, SNR, and/or SINR were above the minimum threshold multiple times during a detection period, determining that the measured signal strength, SNR, and/or SINR were above the minimum threshold for at least a predetermined amount of time, or both. In certain embodiments, the threshold is a minimum threshold that enables the UE to maintain a link with RAN(s) and not be forced into handover. In some embodiments, the LOLO mode is used by the UE as a default when the received signal strength is adequate for the LOLO CA. In certain embodiments, the switching to the LO or LOHI mode includes sending a communication from the UE to RAN(s) requesting release of at least one LO band and receiving a communication from the RAN(s) including one or more LO bands to release. In some embodiments, the communication from the UE includes information pertaining to capabilities of the UE.

When operating in LO or LOHI mode, the UE determines that the received signal strength, SNR, and/or SINR are adequate for aggregation of at least one additional LO band by comparing the measured signal strength, SNR, and/or SINR to the minimum signal strength threshold at 420B. The UE then switches to a LOLO mode by aggregating at least one additional LO band with the current LO band(s) at 430B. Following step 430A and step 430B, the process returns to measuring the received signal strength at 410.

In some embodiments, the UE releases at least one HI band when aggregating LO bands for LOLO CA by switching the UE from using antenna(s) for the at least one HI band to using respective antennas for the at least one additional LO band to aggregate. In certain embodiments, the determination that the received signal strength, SNR, and/or SINR is inadequate for operation in LOLO mode includes determining that the measured signal strength, SNR, and/or SINR fell below the minimum threshold multiple times during a detection period, determining that the measured signal strength, SNR, and/or SINR was below the minimum threshold for at least a predetermined amount of time, or both. In some embodiments, the switching to the aggregating of the additional LO band(s) mode includes sending a communication from the UE to the RAN(s) indicating that the switch from the LOLO mode to the LO or LOHI mode should occur and receiving a communication from the carrier network including which LO band(s) to release.

Figure 5:
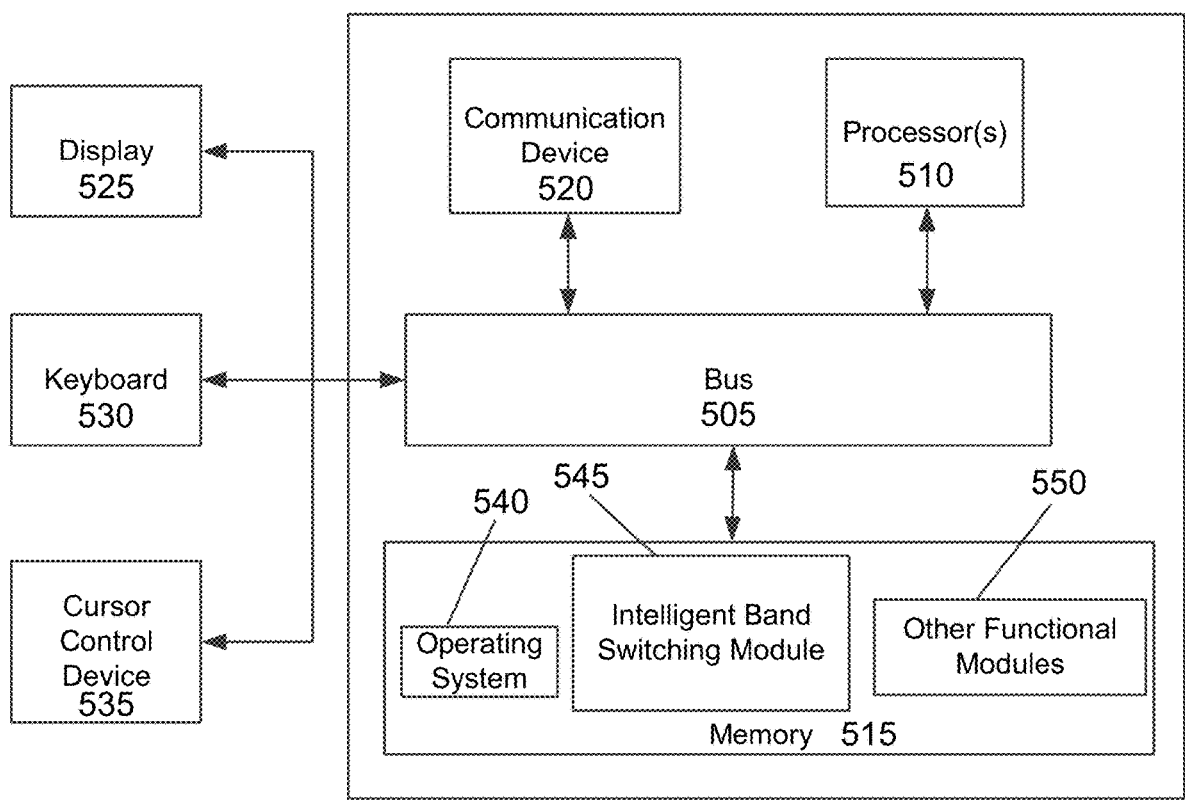
FIG. 5 is an architectural diagram illustrating a computing system configured to perform intelligent band switching and/or aspects thereof, according to an embodiment of the present invention.

FIG. 5 is an architectural diagram illustrating a computing system 500 configured to perform intelligent band switching and/or aspects thereof, according to an embodiment of the present invention. In some embodiments, computing system 500 may be one or more of the computing systems depicted and/or described herein, such as UE, a carrier network computing system, a RAN computing system, etc. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina display, an In-Plane Switching (IPS) display, or any other suitable display for displaying information to a user. Display 525 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an intelligent band switching module 545 that is configured to perform all or part of the processes described herein or derivatives thereof. Computing system 500 may include one or more additional functional modules 550 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 3A-4 may be performed by computer program(s), encoding instructions for the processor(s) to perform at least part of the process(es) described in FIGS. 3A-4, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 510 of computing system 500 of FIG. 5) to implement all or part of the process steps described in FIGS. 3A-4, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program for performing intelligent band switching, the computer program configured to cause at least one processor to:

measure a signal received by user equipment (UE) operating in a LO mode, a LOLO mode, or a LOHI mode where the UE uses at least one current LO band;

determine that the received signal is adequate for aggregation of at least one additional LO band by: determining that the measured signal strength rose above the minimum threshold multiple times during a detection period, determining that the measured signal strength was above the minimum threshold for at least a predetermined amount of time, or both; and aggregate the at least one additional LO band with the at least one current LO band.

2. The non-transitory computer-readable medium of claim 1, wherein the aggregation of the at least one additional LO band comprises switching the UE to using respective antennas for the at least one additional LO band.

3. The non-transitory computer-readable medium of claim 1, wherein the computer program is further configured to cause the at least one processor to:

determine that the signal is inadequate for operation with the aggregated at least one current LO band and the at least one additional LO band by comparing the measured signal to the minimum threshold; and release at least one LO band of the aggregated the at least one additional LO band, the at least one current LO band, or both.

4. The non-transitory computer-readable medium of claim 1, wherein the minimum threshold is a minimum threshold that enables the UE to maintain a link with a radio access network (RAN) and not be forced into handover.

5. The non-transitory computer-readable medium of claim 1, wherein the computer program instructions are further configured to cause the at least one processor to use the LOLO mode as a default when the received signal is adequate for aggregation of multiple LO bands.

6. The non-transitory computer-readable medium of claim 1, wherein when aggregating the at least one additional LO band, the computer program is further configured to cause the at least one processor to:

send a communication from the UE to at least one radio access network (RAN) indicating that the aggregation of the at least one additional LO band should occur; and receive a communication from the at least one RAN comprising an assignment of the at least one additional LO band.

7. The non-transitory computer-readable medium of claim 6, wherein the communication from the UE comprises information pertaining to capabilities of the UE.

8. The non-transitory computer-readable medium of claim 1, wherein the computer program instructions are further configured to cause the at least one processor to:

determine that the received signal is inadequate for the aggregation of the LO bands by comparing the measured signal to the minimum threshold; and release at least one LO band of the aggregated LO bands.

9. The non-transitory computer-readable medium of claim 8, wherein the determination that the received signal is inadequate for the aggregation of the LO bands comprises determining that the measured signal fell below the minimum threshold multiple times during a detection period, determining that the measured signal was below the minimum threshold for at least a predetermined amount of time, or both.

10. The non-transitory computer-readable medium of claim 1, wherein the measurement of the received signal comprises measuring a signal strength, a signal-to-noise ratio (SNR), a signal to interference and noise ratio (SINR), or a combination thereof, of the received signal.

11. A computer-implemented method for performing intelligent band switching, comprising:

measuring a signal received by user equipment (UE) operating in a LOLO mode with two or more current aggregated LO bands, by the UE;

determining that the received signal is inadequate for aggregation of the two or more current aggregated LO bands by determining that the measured signal strength fell below the minimum threshold multiple times during a detection period, determining that the measured signal strength was below the minimum threshold for at least a predetermined amount of time, or both; and releasing at least one LO band of the two or more current aggregated LO bands, by the UE.

12. The computer-implemented method of claim 11, further comprising:

determining that the received signal is adequate for aggregation of at least one additional LO band by comparing the measured signal to the minimum threshold, by the UE; and aggregating the at least one additional LO band, by the UE.

13. The computer-implemented method of claim 11, wherein the minimum threshold is a minimum threshold that enables the UE to maintain a link with a radio access network (RAN) and not be forced into handover.

14. The computer-implemented method of claim 11, wherein the LOLO mode is used as a default when the received signal strength is adequate for the LO band aggregation.

15. The computer-implemented method of claim 11, wherein the releasing of the at least one LO band of the two or more current aggregated LO bands comprises:

sending a communication from the UE to at least one radio access network (RAN) indicating that the at least one LO should be released, by the UE; and receive a communication from the at least one RAN comprising one or more low bands to release.

16. The computer-implemented method of claim 15, wherein the communication from the UE comprises information pertaining to capabilities of the UE.

17. The computer-implemented method of claim 11, wherein the measurement of the received signal comprises measuring a signal strength, a signal-to-noise ratio (SNR), a signal to interference and noise ratio (SINR), or a combination thereof, of the received signal.

18. A computing system, comprising:

memory storing computer program instructions for performing intelligent band switching; and at least one processor configured to execute the computer program instructions, wherein the computer program instructions are configured to cause the at least one processor to:

while the computing system is operating in a LO mode or a LOHI mode comprising a current LO band:

measure a signal received by the computing system, determine that the received signal is adequate for aggregation of at least one additional LO band by: determining that the measured signal strength rose above the minimum threshold multiple times during a detection period, determining that the measured signal strength was above the minimum threshold for at least a predetermined amount of time, or both, and aggregate the at least one additional LO band with a current LO band, and while the computing system is operating in a LOLO mode comprising two or more current aggregated LO bands:

measure the signal received by the computing system, determine that the received signal is inadequate for aggregation of the two or more current aggregated LO bands by comparing the measured signal to the minimum threshold; and release at least one LO band of the two or more current aggregated LO bands.

19. The computing system of claim 18, wherein the determination that the received signal is adequate for the aggregation comprises determining that the measured signal strength rose above the minimum threshold multiple times during a detection period, determining that the measured signal strength was above the minimum threshold for at least a predetermined amount of time, or both, and the determination that the received signal is inadequate for the aggregation of the two or more aggregated current LO bands comprises determining that the measured signal fell below the minimum threshold multiple times during a detection period, determining that the measured signal was below the minimum threshold for at least a predetermined amount of time, or both.

* * * * *